United States Patent

[11] 3,555,957

[72] Inventor Werner Hermle
  Schaan, Liechtenstein
[21] Appl. No. 719,117
[22] Filed Apr. 5, 1968
[45] Patented Jan. 19, 1971
[73] Assignee Hilti, A. G.
  Schaan, Liechtenstein
[32] Priority Apr. 20, 1967
[33] Germany
[31] H62495

[54] SETTING BOLT OR SETTING NAIL CONSTRUCTION
  1 Claim, 8 Drawing Figs.
[52] U.S. Cl. ................................................. 85/10,
  151/41.73
[51] Int. Cl. .................................................... F16b 15/00,
  F16b 19/14, F16b 39/00
[50] Field of Search ........................................... 85/10E, 10,
  30, 21, 22, 20, 1P, 1, 42, 14, 19, 9, 83; 227/9—11,
  130; 151/41.73

[56] References Cited
UNITED STATES PATENTS
1,365,870 1/1921 Temple .................. 85/10EX
1,816,162 7/1931 Tolman .................. 85/20
2,135,888 11/1938 Febrey .................. 85/10EX
2,355,513 8/1944 Cox ...................... 85/1-PX
2,855,817 10/1958 Kopf ..................... 85/10E
FOREIGN PATENTS
231,696 2/1911 Germany ................. 85/42
615,250 7/1935 Germany ................. 151/41.73
725,310 3/1955 Great Britain ........... 85/10E OTHER REFERENCES
Markwardt and Gahagan, " Report On Tests To Determine The Effects Of Nail Points On Resistance To Withdrawal," reprinted from Barrel and Box and Packages, Sept. 1930 Pp. 1— 4.

Primary Examiner—Ramon S. Britts
Attorney—McGlew & Toren

ABSTRACT: A bolt or nail for an explosive powder-driven or power-driven bolt setting tool for setting the nails in metallic materials such as iron and steel sheets includes a bolt body having a shank portion in the form of a truncated cone of small pitch angle extending over the entire shank length. The shank is advantageously provided with a knurled surface over at least a portion of its length. The end face of the bolt body is either planar, concave or convex, or conical with an angle of aperture of preferably 120°. The ratio of the shank length to the shank diameter is within the range of approximately 3:1 to 1:1, and preferably about 2:1.

PATENTED JAN 19 1971  3,555,957

INVENTOR
WERNER HERMLE

BY

McGlew & Toren
ATTORNEYS

3,555,957

SETTING BOLT OR SETTING NAIL CONSTRUCTION

SUMMARY OF THE INVENTION

This invention relates in general to the construction of bolts and nails for setting in metallic materials of small thickness, and in particular to a new and useful bolt or nail construction having a shank portion which is in the form of a truncated cone.

Particularly in the ship building and vehicle construction industries there is a demand for the setting of bolts into steel having a small thickness of from 4 —8 mm., for example. In the known types of bolts used for such purpose, the part of the bolt which penetrates into the material includes an oval tip and a cylindrical shank of short length. Because the tip must penetrate into the target material, the greater part of the tip does not provide a carrying or tensile holding force. The short cylindrical shank and the carrying part of the tip can absorb relatively little specific pressure in proportion to the total length of penetration of the shank and the tip. For this reason, even when the shank portions of the bolts are provided with knurling over their surface, the extraction values are insufficiently high so that they have relatively low load carrying capacity. In order to increase the carrying capacity of these bolts, it is known to let the noncarrying part of the tip project completely through the receiving material to the opposite side thereof. The projecting tips thus present a projecting surface which may cause dangerous injuries when touched unintentionally. In order to avoid these dangerous injuries, the bolt tips and the material displaced outwardly by the bolt must be ground off after the setting of the bolt, and this is a time-consuming operation.

In accordance with the invention, there is provided a bolt construction which avoids the disadvantages of the prior art and provides a bolt which, despite small thickness of the target material, will present no dangerous projecting tips but it will still have sufficient carrying capacity. For this purpose the bolt is given the form of a truncated cone of small pitch angle over substantially the entire length of the shank portion. It has been found that some frustum-shaped bolts can be manufactured without requiring a pronounced tip while maintaining adequate carrying capacity. Thus, even if the tip is omitted and the shank is provided with the form of a truncated cone, the advantage is achieved that the material is stamped out by the blunt end face of the bolt shank part and there is no protruding tip. In the preferred arrangement, the frustum-shaped shank is provided wholly or in part with a knurling in order to increase the extraction value or load carrying capacity of the bolt or nail. The end face of the frustum is designed either planar or concave, but preferably convex or conical and with a cone aperture of 120°.

Accordingly it is an object of the invention to provide an improved setting bolt construction for use with power-driven setting tools which includes a shank portion which is in the form of a truncated cone of small pitch angle over substantially its entire shank length.

A further object of the invention is to provide a setting bolt having a body with a threaded portion adjacent one end and a shank portion adjacent the opposite end of frustoconical configuration and wherein the end of the conical portion is formed either planar, convex, concave or conical.

A further object of the invention is to provide a setting bolt which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
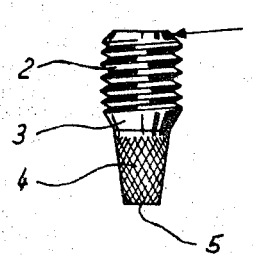
FIG. 1 is a side elevational view of a setting bolt constructed in accordance with the invention.
Figure 2:
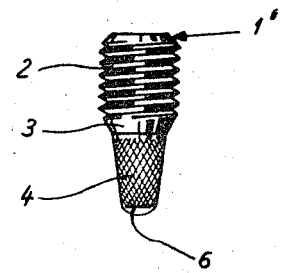
FIGS. 2 to 4 are views similar to FIG. 1 of other embodiments of the invention.
Figure 3:
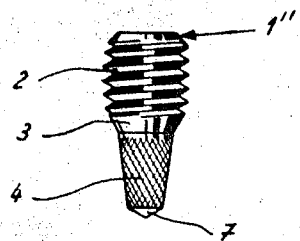
Figure 4:
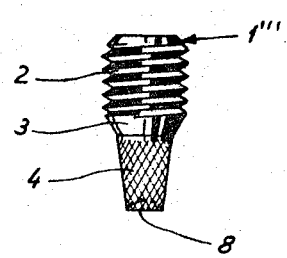

Referring to the drawings in particular, the invention embodied therein in FIG. 1 comprises a setting bolt 1 having a body which includes a threaded portion 2 with a conical dome, a transition portion 3 having a conical form with a relatively great pitch angle and a shank portion 4 of conical form throughout its length and having a small pitch angle. The end face 5 in this embodiment is made planar. In FIGS. 2 to 4, various embodiments of the setting bolt are indicated. In FIG. 2, the setting bolt 1' includes a convex end face, in FIG. 3 the end 7 is conical for the setting bolt 1'', and in FIG. 4 the setting bolt 1''' includes a concave end face 8, and in FIG. 7 the bolt 1'''' includes a planar end face 9 and a shank portion 4' which is of substantially a truncated cone formation but includes bulging or convex walls.

Figures 5, 6, 7, 8:
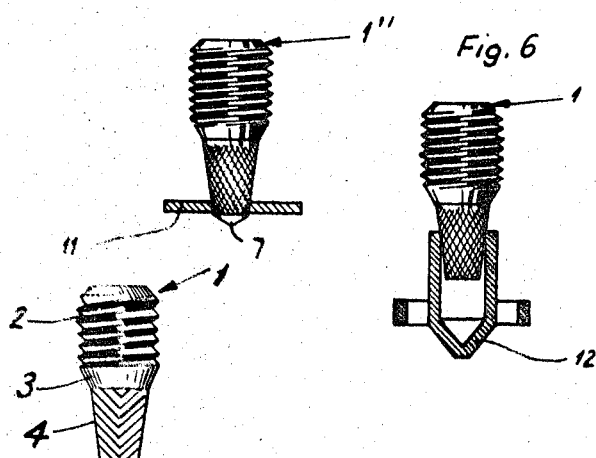
FIG. 5 is a setting bolt similar to that indicated in FIG. 3 shown in association with a guide washer.
FIG. 6 is a view similar to FIG. 1 with the setting bolt shown in association with a guide washer of a different form.
FIG. 7 is an enlarged partial elevational view of another embodiment of setting bolts.
FIG. 8 is a setting bolt similar to that shown in FIG. 1 but with an alternate knurled surface configuration.

In FIG. 5, the setting bolt 1'— is shown in association with a guide body or washer 11. In FIG. 6, the setting bolt 1 is shown in association with a guide body or washer 12 of a different configuration.

In FIGS. 1 to 7 the shank portion 4 is knurled in a diamond configuration, while in FIG. 8 the shank portion 4 is knurled in a herringbone configuration.

While specific embodiments of the invention have been shown and described in detail to illustrate the application of the inventive principles, it will be understood that the invention may be embodied otherwise without departing from such principles.

I claim:

1. A bolt construction of a hard material capable of being driven into a receiving material such as concrete and steel by an explosive force operated setting tool, comprising a body having a generally cylindrical threaded portion defining the head end of the bolt, a hard-material-penetrating shank portion of truncated conical form and of small pitch angle over its entire shank length, the diameter of the shank being reduced in the direction of the leading end of the bolt, the maximum diameter of the shank being less than the minimum diameter of the threaded portion, the shank portion terminating in a blunt penetrating extremity and an intermediate conical transition portion between said threaded portion and said shank portion tapered inwardly towards said shank portion, said shank portion being substantially free of projections to permit it to penetrate into the receiving material but having a plurality of grooves defined in its surface providing means for holding the bolt in the receiving material, the ration of the length of the shank portion to the medium shank diameter being approximately from 3:1 to 1:1 and preferably about 2:1. the ratio of the length of the shank portion to the medium shank diameter being approximately from 3:1 to 1:1 and preferably about 2:1.